C. TEACHOUT.
Metal Drill Rest.
No. 28,791.
Patented June 19, 1860.
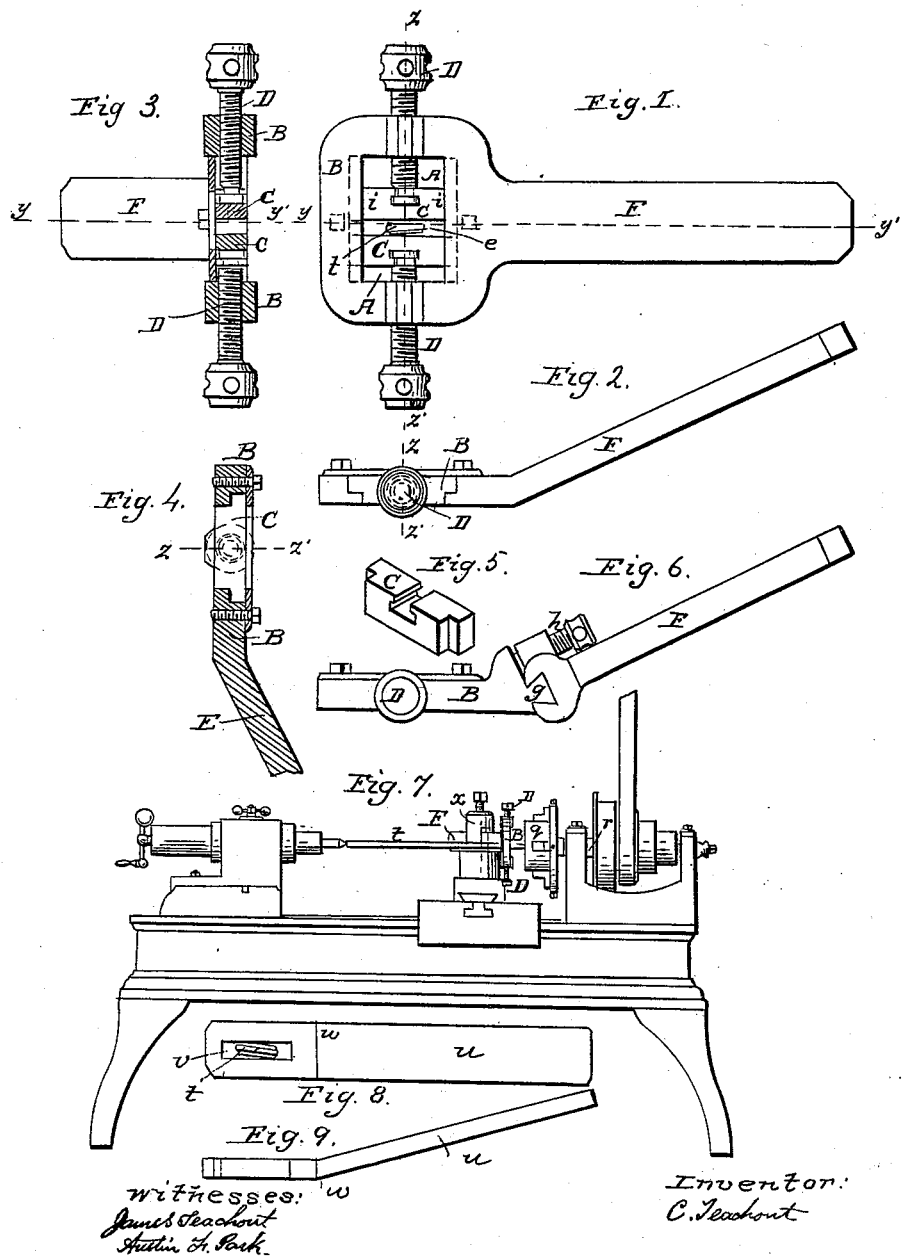

UNITED STATES PATENT OFFICE.

CORNELIUS TEACHOUT, OF WATERFORD, NEW YORK.

DRILL-REST.

Specification of Letters Patent No. 28,791, dated June 19, 1860.

*To all whom it may concern:*

Be it known that I, CORNELIUS TEACHOUT, of the village of Waterford, in the county of Saratoga and State of New York, have invented a new and improved drill-rest for use in the tool-posts of machinists' lathes to hold and guide the front or cutting end of the drill when the thing to be bored out is fastened to and revolves with the head-spindle of the lathe and the drill not turned but fed endwise to the work by the tail-center pressing against the back end of the drill; and I do hereby declare that the following contains a full and exact description of the same, reference being had to the annexed drawings, which make a part of this specification, and in which—

Figure 1 is a side elevation, Fig. 2 a top view, Fig. 3 a cross section at the line $z\ z'$, Fig. 4 a longitudinal section at the line $y\ y'$, and Fig. 5 an isometrical projection of one of the adjustable guide-blocks, all of one of my improved drill-rests; Fig. 6 a top view of a modification of the same; Fig. 7 an elevation of a machinist's lathe with one of my improved drill-rests in use therein; and Fig. 8 an elevation, and Fig. 9 a plan, of a drill-rest such as is in common use in machinists' lathes.

The same letters refer to the same parts wherever represented in the drawings.

Drill-rests for use in the tool-post, $x$, Fig. 7, of a machinist's lathe, have been heretofore made, each of a simple flat bar $w$, of iron, by punching or forging an oblong hole or slot, $v$, therein, and bending the shank, $u$, of the bar sidewise more or less, as is indicated by Figs. 8 and 9 of the annexed drawings. But each drill-rest of that kind is only suitable for holding and guiding drills of one size. Hence, of that kind, as many drill-rests of different sizes are required for a lathe as there are different sizes of drills to be used therein. And it is often very difficult, and requires much time, with such drill-rests, even after one of a proper size for the drill is found,—to so set the rest in the tool-post of the lathe that the drill, $t$, when passed through the slot in the rest and set with its back end against the tail-center, $s$, of the lathe, will then point toward the head-center or be in line with the axis of the spindle $r$ of the lathe and the revolving article, $g$, to be drilled. In order to produce a drill-rest which shall not have those defects, I increase the size of the opening, A, Fig. 1, in the stock, B, of the drill-rest, in a vertical direction, to beyond the size of the largest drills to be used therein; and furnish that opening with two guide-blocks, C, C, to hold and direct the drill, which guide-blocks I arrange horizontally, and one above and opposite to the other, and form the stock with ways along the vertical sides, $i, i$, of the opening, and construct the guide-blocks so that they slide thereon, and provide the guide-blocks each with adjusting screws, D, D, working respectively through the top and the bottom sides of the stock; so that by simply turning those screws the guide-blocks may be separately slid up and down in the stock, so that the space $e$, Fig. 1, for the drill, $t$, between the two guide-blocks may thereby be readily made of any width required to guide drills of various sizes, and the guide-blocks be quickly adjusted at different heights, as will be required in use to bring the point of the drill against the center of the article to be drilled; the stock B of the rest being provided with a shank, F, formed to fit in the tool-post of a lathe as shown in Fig. 7, and so arranged in respect to the guide-blocks that when the shank is screwed fast in the tool-post of the lathe the guide blocks may then be slid up and down by the screws, D, D, in a plane perpendicular or nearly so to the axis of the lathes, and the construction of the parts being substantially such as is represented by Figs. 1, 2, 3, 4 and 5 of the annexed drawings.

Machinists who are practically familiar with the use of drill-rests in lathes, at once perceive the great practical value of my improved drill-rest above described, by which invention the operations of miscellaneous drilling in machinists' lathes are greatly expedited and facilitated, and are effected at much less expense than by the drill-rests heretofore in common use in machine shops. For with only one of my improved drill-rests, the workman, after simply clamping the shank, F, in the tool-post of the lathe, without particular care to set the stock at any certain height, can then almost instantly adjust the two guide-blocks C, C, by the screws D, D, so as to thereby accurately hold and guide the drill to its work whatever may be the particular size of the drill in use, and however much, (within the range of the adjustability of the guide-blocks,) the height of the axis of the lathe may vary in respect to that of the tool-post-socket in which the shank of the drill-rest is fastened. When a very great range of adjustability in a vertical direction is desired the stock B may be made adjustable on the shank F by means of a dove-tail tongue $g$ fitted to slide in a corresponding groove, and to be clamped fast at any height by means of a set-screw, $h$, as indicated in Fig. 6.

What I claim as new and of my invention, and desire to secure by Letters Patent as a new and improved article of manufacture, is—

A drill-rest provided with a shank, F, movable guide-blocks, C, C, and adjusting-screws, D, D, all constructed and arranged together substantially as herein described, for use in the tool-holders of machinists' lathes.

C. TEACHOUT.

Witnesses:
JAMES TEACHOUT,
AUSTIN F. PARK.